United States Patent [19]
Yanagi

[11] Patent Number: 5,150,347
[45] Date of Patent: Sep. 22, 1992

[54] BEAM TRACK POSITION CONTROL APPARATUS FOR OPTICAL DISK APPARATUS

[75] Inventor: Shigenori Yanagi, Kawasaki, Japan
[73] Assignee: Fujitsu Limited, Kawasaki, Japan
[21] Appl. No.: 488,147
[22] Filed: Mar. 5, 1990
[30] Foreign Application Priority Data
Mar. 14, 1989 [JP] Japan ................................. 1-61530
[51] Int. Cl.⁵ .............................................. G11B 7/00
[52] U.S. Cl. ............................ 369/44.37; 369/44.38; 369/44.29
[58] Field of Search .... 369/44.32, 44.29, 44.37–44.39, 369/110, 124, 109, 44.14–44.22, 121, 122; 250/201.5, 202

[56] References Cited
U.S. PATENT DOCUMENTS

| | | | |
|---|---|---|---|
| 4,074,085 | 2/1978 | Russell . | |
| 4,571,712 | 2/1986 | Romano et al. | 369/44.38 |
| 4,577,301 | 3/1986 | Mathews et al. . | |
| 4,700,336 | 10/1987 | Yoshida et al. | 369/44.38 |
| 4,975,895 | 12/1990 | Yanagi | 369/44.29 |
| 4,985,882 | 1/1991 | Tanaka et al. | 369/44.32 |

FOREIGN PATENT DOCUMENTS
0255188 2/1988 European Pat. Off. .

*Primary Examiner*—Roy N. Envall, Jr.
*Assistant Examiner*—Thang V. Tran
*Attorney, Agent, or Firm*—Staas & Halsey

[57] ABSTRACT

A beam track position control apparatus for an optical disk apparatus is disclosed. The track positions of first and second beams of light are controlled simultaneously by a track servo control, and the track position of the second beam is controlled independently by a second beam track servo control provided independently of the first-mentioned track servo control. In particular, the first and second beams are controlled simultaneously in response to a track error signal obtained from an output of a first photodetector, and the track position of the second beam is controlled independently in response to another track error signal obtained from an output of a second photodetector thereby to correct the track position of the second beam relative to the track position of the first beam. With this control, the first and second beams can always be positioned on the same track on an optical disk.

8 Claims, 11 Drawing Sheets

FIG. 4A
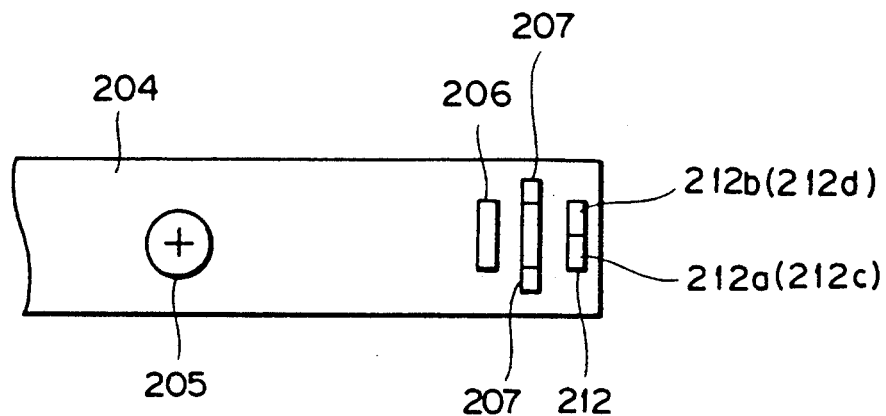
FIG. 4B  FIG. 4C  FIG. 4D
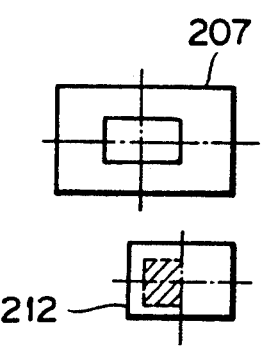
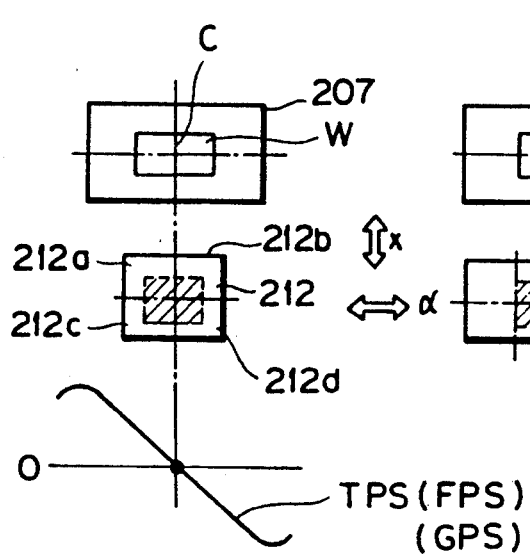
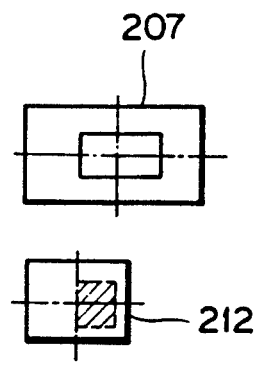

BEAM TRACK POSITION CONTROL APPARATUS FOR OPTICAL DISK APPARATUS

BACKGROUND OF THE INVENTION

This invention relates to a beam track position control method and apparatus for an optical disk apparatus, and more particularly to a beam track position control method and apparatus for an optical disk apparatus wherein two beams including a write beam and a read beam pass through a single object lens of an optical head such that, while data are being written onto a certain track of an optical disk with the write beam, the information written with the write beam is read out with the read beam, which is positioned rearwardly of (following) the write beam in the direction of rotation of the disk.

A verify read operation is carried out with a conventional optical disk apparatus. Such a verify read involves reading, after data have been written onto an optical disk, of such data to compare the read out data with the write data to assure the reliability of the optical disk apparatus.

In conventional systems, a single beam of light is projected onto an optical disk by way of an object lens of an optical head so that it may serve for both of writing and reading. More particularly, using a single beam of light, writing is carried out for a certain one rotation of an optical disk, and then, reading is carried out for a next one rotation of the optical disk, whereafter the write data and the read data are compared with each other. With an optical disk apparatus which carries out such verify read, an optical disk must be rotated by two complete rotations for the writing of data, and there is a problem that much time is required.

In recent years, a technique has been proposed wherein a write beam and a read beam pass through a single object lens of an optical head at the same time such that, while data are being written onto a certain track of an optical disk with the write beam, the information written with the write beam is read out by the read beam which is positioned rearwardly of the write beam in the direction of rotation of the disk. Consequently, writing of data and verify read are carried out at the same time to thereby reduce the data writing time of the optical disk apparatus. In the optical disk apparatus, focusing of a beam of light is controlled by a focusing servo controller while the track position of the beam is controlled by a track servo controller simultaneously for both the write beam and the read beam. Track servo control makes use, for example, of a variation of the amount of reflected light due to a diffraction phenomenon of a beam spot by a spiral guide groove (track) provided in advance on an optical disk. In particular, making use of the fact that a reflected light amount distribution detected by a photodetector is varied with a diffraction of light by a track depending upon a position of a beam spot relative to the track, a track error signal of a beam spot with respect to the track is obtained.

Such track error signal is obtained by receiving an amount of reflected light of a write beam by means of a photodetector. Conventionally, in an optical disk apparatus wherein two beams of light are projected onto an optical disk through a single object lens to carry out writing and reading of data at the same time, a track error signal is obtained only from the write beam to control the track positions of the two beams at the same time.

With this controlling method, however, it has been discovered that, while control in the focusing direction is sufficient for practical use, a read beam is sometimes displaced in a direction across tracks so that the beam reads, for example, an adjacent track. It can be considered that this displacement of a read beam is caused by a variation of the index of refraction, time aging, etc. of a lens or the like due to a temperature variation in an optical head.

Once such displacement of a read beam with respect to a track takes place, even if a write beam is projected onto a predetermined track position, the read beam will not be positioned on the same track as the write beam. Consequently, it is impossible to carry out verify read with a read beam during data writing with the write beam.

SUMMARY OF THE INVENTION

Accordingly, it is an object of the present invention to provide a beam track position control apparatus for an optical disk apparatus wherein the track positions of two beams including a main beam and an auxiliary beam which are to be projected onto an optical disk through a single object lens can be controlled accurately.

It is another object of the present invention to provide a beam track position control apparatus for an optical disk apparatus wherein the track position of an auxiliary beam which is to be projected onto an optical disk together with a main beam through a single object lens can be controlled independently of the track position of the main beam.

It is a further object of the present invention to provide a beam track position control method for an optical disk apparatus wherein the track positions of both of a main beam and an auxiliary beam which are to be projected onto an optical disk through a signal object lens can be controlled accurately.

In accordance with an aspect of the present invention, there is provided a beam track position control apparatus for an optical disk apparatus including a rotatable optical disk on which a plurality of guide grooves for guiding a beam spot projected thereon are spirally formed along a direction of rotation of the rotatable optical disk. An optical head is provided including a first light source for emitting a first beam of light, a second light source for emitting a second beam of light and an object lens for focusing the first and the second beams onto the optical disk. Track actuator means are provided for moving the object lens in the radial direction. In the present invention, the beam track position control apparatus includes a first photodetector means for detecting light of the first beam reflected from the optical disk and producing a first output signal. The beam track position control apparatus also includes second photodetector means for detecting light of the second beam reflected from the optical disk and producing a second output signal. Means are provided for inclining the optical axis of the second beam passing through said object lens and changing the position of the second beam incident on said optical disk. Actuator means are also provided for driving said optical axis inclining means. Additionally third photodetector means are provided for detecting a current position of said optical axis inclining means and producing a third output signal. First control means are provided for controlling the track actuator means based on a track error signal obtained from the first output signal from the first photodetector means. Finally, second control means for controlling the actuator means based on another track error signal obtained from the second output signal from the second photodetector means and a current position signal obtained from the third output signal from the third photodetector to thereby change the position of the second beam incident on said optical disk.

With the beam track position control apparatus of the present invention, since the actuator means for driving the optical axis inclining means is controlled independently by the second control means, the track position of the second beam can be controlled independently of the track position of the first beam. Consequently, the track positions of the two beams can always be controlled accurately irrespective of an environmental variation such as a temperature variation or time aging.

In accordance with another aspect of the present invention, there is provided a beam track position control method for an optical disk apparatus including a rotatable optical disk on which a plurality of guide grooves for guiding a beam spot projected thereon are spirally formed along a direction of rotation of the rotatable optical disk, and an object lens for focusing light beams onto the optical disk. This method includes the following steps. First, first and second beams are projected onto the optical disk simultaneously through the object lens. Then, a first signal is obtained by detecting light of the first beam reflected from the optical disk. A track error signal is produced from the first signal. The movements of beam spots of the first and second beams on the optical disk are controlled based on the track error signal. A second signal is obtained by detecting light of the second beam reflected from said optical disk. Another track error signal is produced from said second signal. Finally the movement of the beam spot of the second beam on the optical disk is controlled based on said another track error signal.

The above and other objects, features and advantages of the present invention and the manner of realizing them will become more apparent, and the invention itself will best be understood, from a study of the following description and appended claims, with reference had to the attached drawings showing preferred embodiments of the invention.

BRIEF DESCRIPTION OF THE DRAWINGS

FIG. 4A is a schematic view showing an arrangement of a position sensor of the object lens actuator;

FIGS. 4B, 4C and 4D are illustrative views showing a manner wherein a received light distribution of the position sensor varies in accordance with amounts of movement of the object lens actuator in an α direction and an X direction;

DESCRIPTION OF THE PREFERRED EMBODIMENTS

Before preferred embodiments of the present invention are described, the conventional apparatus described hereinabove will be described in more detail with reference to the drawings because it is considered desirable to describe construction and disadvantages of the conventional apparatus in order to facilitate understanding of the present invention.

Figure 1:
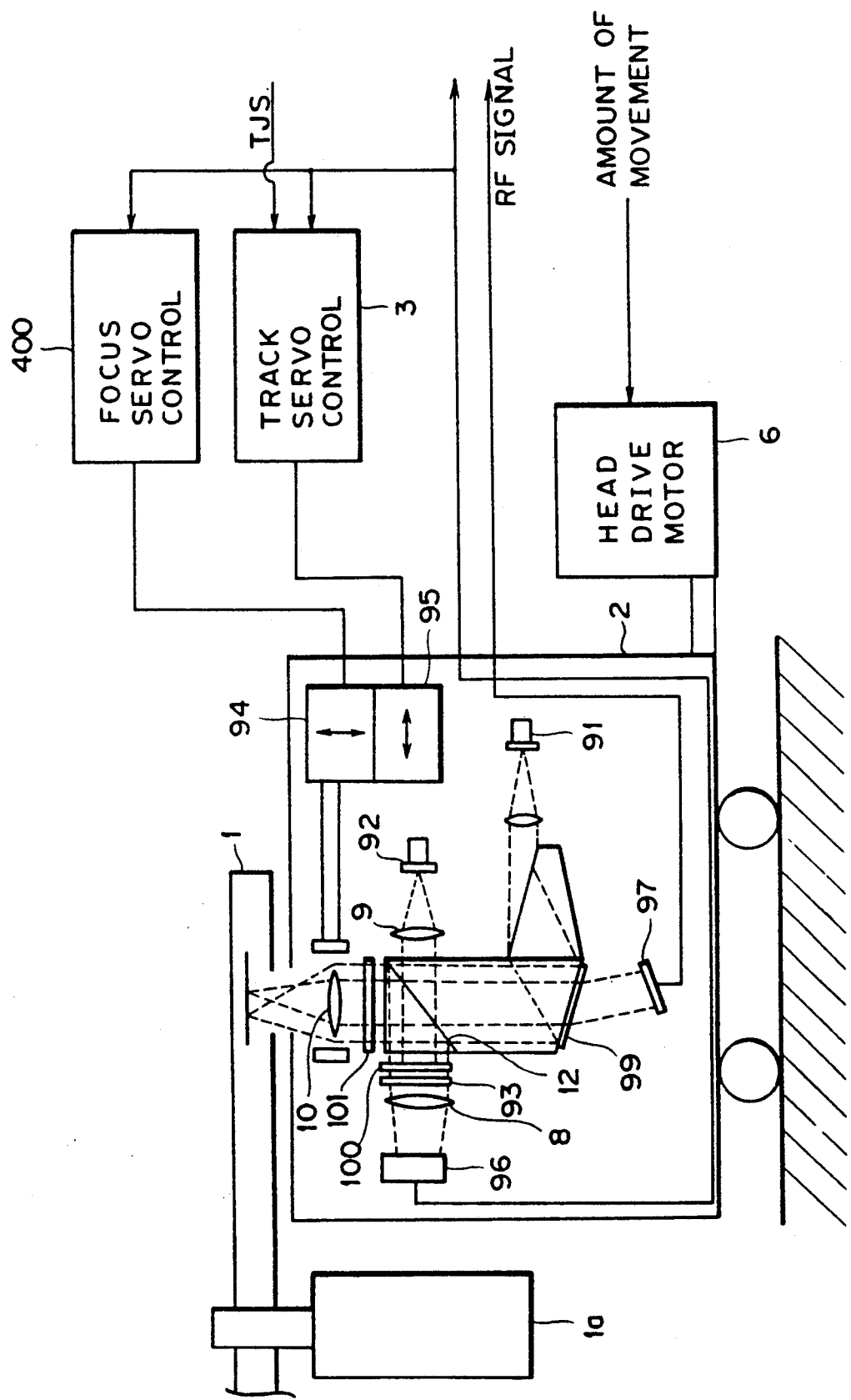
FIG. 1 is a schematic view showing construction of a conventional optical head wherein two beams of light pass through a single object lens and a control system for the optical head.
Figure 2:
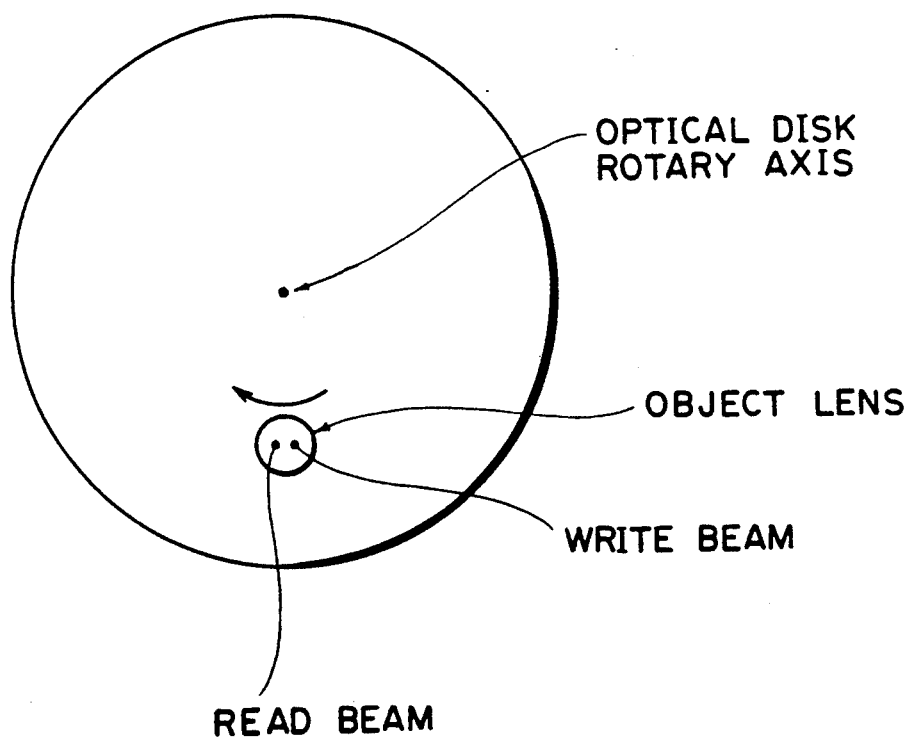
FIG. 2 is a schematic view showing a positional relationship between a write beam and a read beam on a rotatable optical disk.

Referring at first to FIG. 1, there is shown a construction of an optical head section of the conventional optical disk apparatus N described above. The optical head section shown includes a motor 1a for rotating an optical disk 1 around an axis of a rotary shaft thereof, and an optical head 2 which is moved and positioned in a radial direction of the optical disk 1 with respect to the optical disk 1 by a head drive motor 6. The optical head 2 has an object lens 10 through which two beams of light pass to carry out reading (reproduction) from and writing (recording) onto the optical disk 1 with the individual beams. The two beams are introduced simultaneously from the single object lens 10 to the optical disk 1 and have such a positional relationship as shown in FIG. 2 wherein the write beam is positioned on the upstream side of the read beam in the direction of rotation of the optical disk 1 on the same track.

Referring back to FIG. 1, the write beam is emitted from a semiconductor laser 91 which serves as a light source. The thus emitted beam of light is reflected by a dichroic mirror 99 and passes through a polarizing beam splitter 12. Then the beam is changed into circularly polarized light by a quarter-wave plate 101 and then introduced into the object lens 10 so that it is focused into a beam spot and projected upon the optical disk 1. Reflected light from the optical disk 1 passes first through the object lens 10 and then through the quarter-wave plate 101 again whereupon its polarization plane is rotated by 90 degrees with respect to the polarization plane of the original beam. Consequently, the reflected light of the write beam from the optical disk 1 is reflected by the polarizing beam splitter 12 and then passes through a lens 8 whereafter it is introduced to a four-division photodetector 96.

The read beam is emitted from another semiconductor laser 92 and has a different wavelength from that of the write beam. The read beam is then collimated by a collimate lens 9 and then passes through the polarizing beam splitter 12 and further through another quarter-wave plate 100 whereupon it is changed into circularly polarized light, whereafter it is reflected by another dichroic mirror 93. Then, the read beam passes again through the quarter-wave plate 100 whereon the polarization plane thereof is rotated by 90 degrees from the polarization plane of the original beam. Consequently, the read beam is reflected by the polarizing beam splitter 12 and then projected onto the optical disk 1 through the quarter-wave plate 101 and object lens 10. Reflected light of the read beam from the optical disk 1 passes again through the quarter-wave plate 101 whereon the polarization plane thereof is rotated so that it may coincide with the polarization plane of the original beam. Consequently, the reflected light of the read beam thereafter passes through the polarizing beam splitter 12 and then through the dichroic mirror 99 and is introduced to another photodetector 97.

In the meantime, in such optical disk apparatus, a large number of tracks are formed on the optical disk 1 in a spaced relationship by several microns in a radial direction of the optical disk 1, and displacement of a track is increased even by a little eccentricity of the optical disk 1. Further, while displacement of a beam spot on the optical disk is caused by inadvertent movement of the optical disk 1, a beam spot having a size smaller than 1 micron must follow the displacement of the track. To this end, the optical head section further includes a focus actuator or focus coil 94 for moving the object lens 10 of the optical head 2 in upward and downward directions in FIG. 1 to change the focus position, and a track actuator or track coil 95 for moving the object lens 10 in leftward and rightward directions in FIG. 1. The optical head section further includes a focus servo control 400 for producing a focus error signal FES from a received light signal of the photodetector 96 to drive the focus actuator 94, and a track servo control 3 for producing a track error signal TES from a received light signal of the photodetector 96 to drive the track actuator 95.

The track servo control 3 makes use, for example, of a change of an amount of reflected light caused due to a diffraction phenomenon of a beam spot by one of a plurality of spiral guide grooves (tracks) provided in advance on the optical disk 1. In particular, making use of the fact that a reflected light amount distribution detected by the photodetector 96 is varied by a diffraction of light by a track depending upon a position of a beam spot relative to the track, a track error signal (position error signal) of a beam spot with respect to the track is obtained. Such track error signal is obtained by detecting a reflected light amount of a write beam by means of the photodetector 96. In the conventional optical disk apparatus wherein two beams of light are simultaneously projected onto the optical disk 1 through the single object lens to carry out writing and verify read of data at the same time, a track error signal is obtained only from the write beam to simultaneously control the track positions of the two beams including the write beam and the read beam.

With such conventional beam track position control method, however, it has been found out that such displacement of a read beam in the direction across the tracks on the optical disk is caused by a variation of the index of refraction, time aging and so forth of a lens or the like due to such a temperature variation as described hereinabove.

Figure 3:
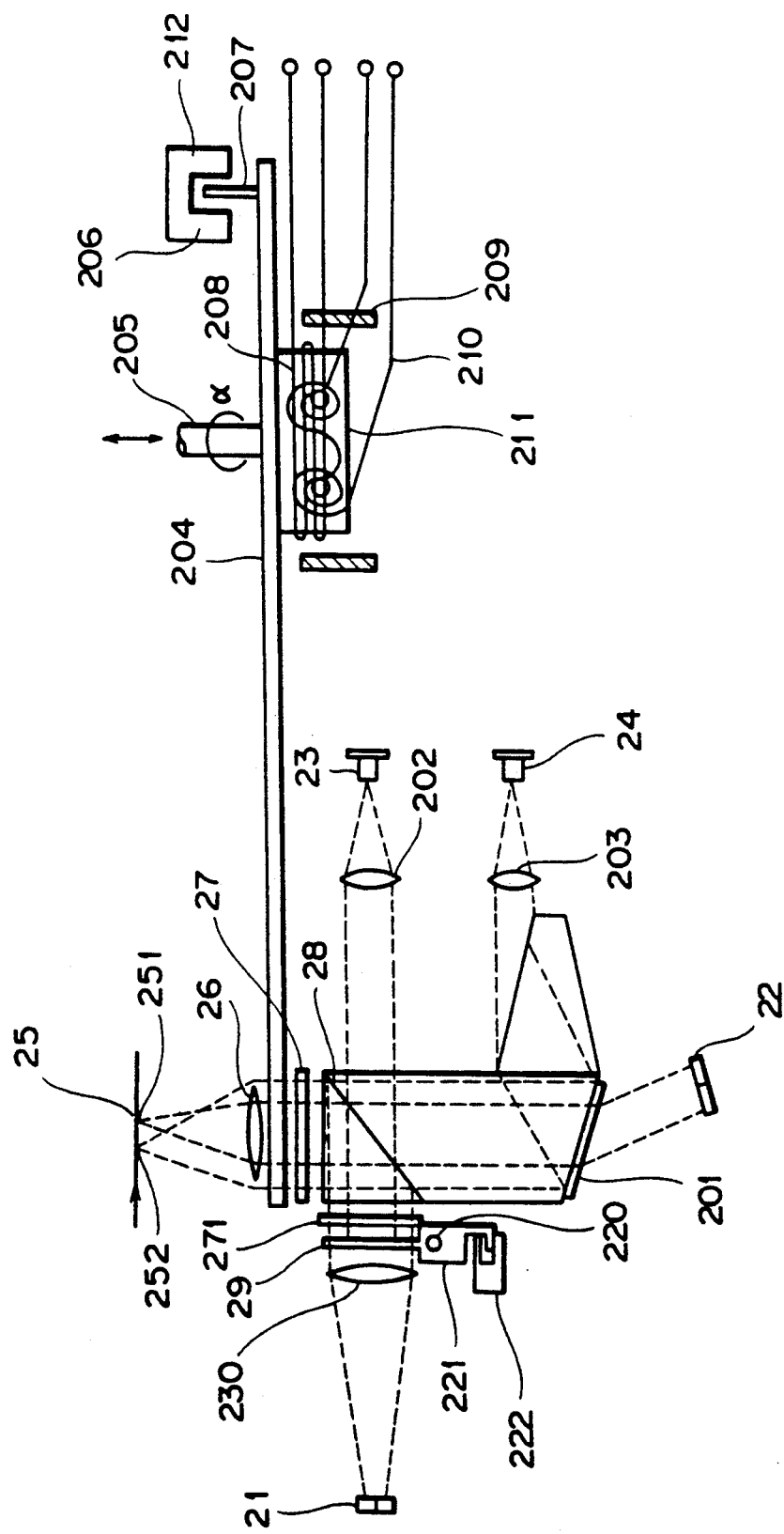
FIG. 3 is a schematic view showing construction of an optical head and an object lens actuator of an embodiment of the present invention.

The present invention has been made to solve such problems of the conventional apparatus as described above and will be described in detail below in connection with preferred embodiments thereof. Referring to FIG. 3, a semiconductor laser 24 emits a write beam of light of a wavelength of 830 nm. The beam of light emitted from the semiconductor laser 24 is changed into a collimate beam by a collimator lens 203 and then reflected by a dichroic mirror 201. The dichroic mirror 201 is constituted such that it passes light of a wavelength of 780 nm therethrough but reflects light of another wavelength of 830 nm. The write beam reflected by the dichroic mirror 201 then passes through a polarizing beam splitter 28 and then through a quarter-wave plate 27 whereupon it is changed into circularly polarized light, whereafter it is focused into a beam spot 252 on an optical disk 25 by an object lens 26. Reflected light from the optical disk 25 passes through the object lens 26 and then through the quarter-wave plate 27 again whereupon the polarization plane thereof is rotated by 90 degrees from the polarization plane of the original write beam. Consequently, the reflected light is reflected by the polarizing beam splitter 28, and then it is changed into circularly polarized right by another quarter-wave plate 271 and then introduced into a galvano mirror 29. Since the galvano mirror 29 is constituted such that it passes light of a wavelength of 830 nm therethrough but reflects light of another wavelength of 730 nm, the reflected light passes through the galvano mirror 29, whereafter it is focused on a four-division photodetector 21 by a lens 230.

Another semiconductor laser 23 emits a beam of light of a wavelength of 780 nm for use as a read beam. The beam of light emitted from the semiconductor laser 23 is changed into a parallel beam by a collimator lens 202 and then passes through the polarizing beam splitter 28, whereafter it is changed into circularly polarized light by the quarter-wave plate 271. The circularly polarized beam of light is then reflected by the galvano mirror 29 and then passes again through the quarter-wave plate 271 whereupon the polarization plane thereof is rotated by 90 degrees from the polarization plane of the original read beam. Consequently, the beam is reflected by the polarizing beam splitter 28, and after then, it is changed into circularly polarized light by the quarter-wave plate 27 and focused into a beam spot 251 on the optical disk 25 by the object lens 26. Then, when reflected light from the optical disk 25 passes again through the quarter-wave plate 27, the polarization plane thereof is rotated so that it may coincide with the polarization plane of the original read beam. Consequently, the reflected light of the read beam thereafter passes through the polarizing beam splitter 28 and then through the dichroic mirror 201 whereafter it is introduced to a two-division photodetector 22.

In the meantime, the object lens 26 is provided at an end of an object lens actuator body or track actuator body 204 which is mounted for rotation around a rotary shaft 205. The actuator body 204 has a fixed slit plate 207 formed at the other end thereof. A bobbin 211 is fixedly mounted on the actuator body 204, and a focus actuator or focus coil 208 is provided around the bobbin 211 while a spiral track actuator or track coil 210 is provided on a side face of the bobbin 211. A magnet 209 is provided around the bobbin 211.

Accordingly, when the focus coil 208 is energized, the object lens actuator body 204 on which the object lens 26 is carried is moved in a direction of the X-axis or in an upward or downward direction in FIG. 3 in a similar manner to a voice coil motor, thereby changing the position of the object lens 26 in a focus direction. On the other hand, when the track coil 210 is energized, the object lens actuator body 204 is rotated in a α direction around the rotary shaft 205, thereby changing the position of the object lens 26 in a direction across the tracks.

A light emitter 206 and a photodetector 212 which constitute a position sensor are provided in such a manner on the opposite sides of the fixed slit plate 207 provided at the end of the actuator body 204 as shown in FIG. 4A. The photodetector 212 is constituted from a four-division photodetector which is divided into four portions 212a to 212d. A window W is formed at the fixed slit plate 207 as shown in FIGS. 4B-4D so that light from the light emitter 206 may be received by the four-division photodetectors 212a to 212d by way of the window W.

Consequently, the received light distributions of the four-division photodetectors 212a to 212d vary in accordance with amounts of movement of the actuator body 204 in the α direction and the X direction as shown in FIGS. 4B-4D. Accordingly, a position signal TPS for the track direction and another position signal FPS for the focus direction are obtained from outputs A, B, C and D of the four-division photodetectors 212a to 212d in the following manner.

$$TPS = (A+C) - (B+D)$$

$$FPS = (A+B) - (C+D)$$

Such position signals TPS and FPS present a substantially S-shaped variation with respect to a displacement from the center position at which they present a value equal to 0 as shown in FIGS. 4B-4D. An electric spring force acting toward the center position can thus be provided using such position signals TPS and FPS.

Figure 5A:
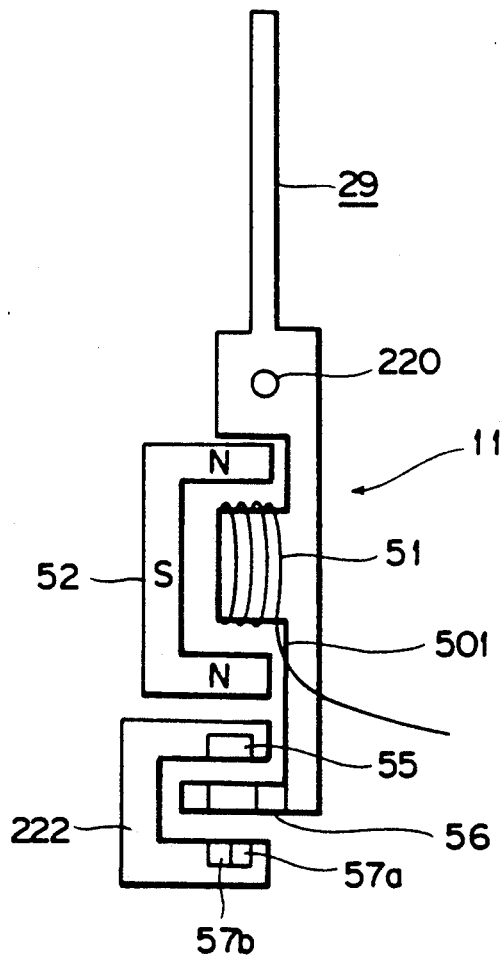
FIG. 5A is a schematic side elevational view showing details of a galvano mirror assembly.
Figure 5B:
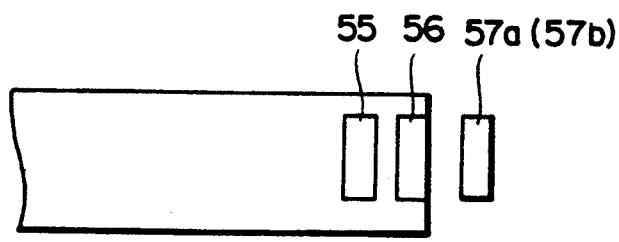
FIG. 5B is a schematic view showing an arrangement of a position sensor of the galvano mirror assembly.

As best shown in FIG. 5A, a galvano mirror assembly 11 is constituted from the galvano mirror 29 mounted for pivotal motion around a shaft 220, a galvano mirror position sensor 222, and a magnet 52. A bobbin 51 is provided in an integrated relationship on the galvano mirror 29, and a read beam track coil or galvano mirror actuator 501 is wound around the bobbin 51. When the coil 501 is energized, the galvano mirror 29 is pivoted around the shaft 220. The galvano mirror position sensor 222 is constituted from a light emitter 55, a slit plate 56 and a two-division photodetector 57. The fixed slit plate 56 is provided in an integrated relationship at the opposite end portion of the galvano mirror 29 with respect to the shaft 220. As shown in FIG. 5B, the light emitter 55 and the two-division photodetectors 57a and 57b are disposed in an opposing relationship through the fixed slit plate 56.

Figure 5C:
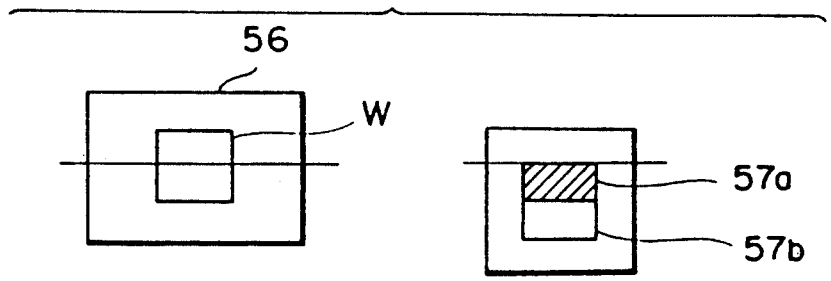
FIGS. 5C, 5D and 5E are schematic illustrations showing a change of a received light distribution of the galvano mirror position sensor when the galvano mirror is rocked.
Figure 5D:
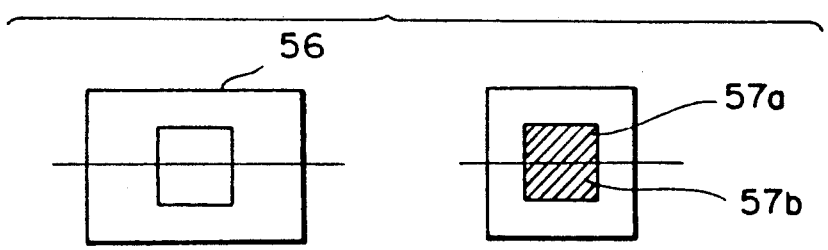
Figure 5E:
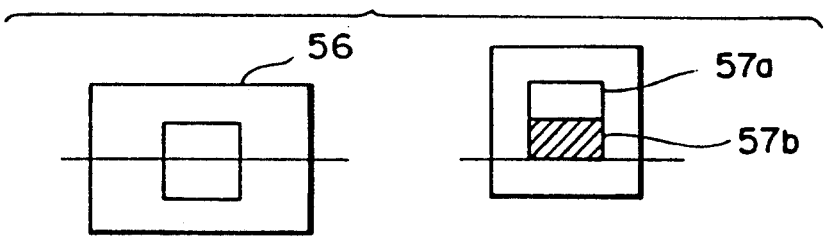

As shown in FIGS. 5C-5E, a window W is provided in the fixed slit plate 56 so that light from the light emitter 55 may be received by the two-division photodetectors 57a and 57b by way of the window W. Consequently, the received light distribution of the two-division photodetectors 57a and 57b vary in accordance with an amount of pivotal motion of the galvano mirror 29 around the shaft 220 as shown in FIGS. 5C-5E. Accordingly, a galvano mirror position signal GPS in the direction across the tracks can be obtained from outputs A and B of the two-division photodetectors 57a and 57b in the following manner.

$$GPS = A - B$$

Such galvano mirror position signal GPS presents a substantially S-shaped variation with respect to a displacement from the center position at which it presents a value equal to 0 similarly to the position signals TPS and FPS shown in FIGS. 4B-4D, and an electric spring force acting toward the center position can thus be provided using the galvano mirror position signal GPS.

Subsequently, referring to FIGS. 6 and 7, construction of the track servo control of the embodiment of the present invention will be described.

Figure 6:
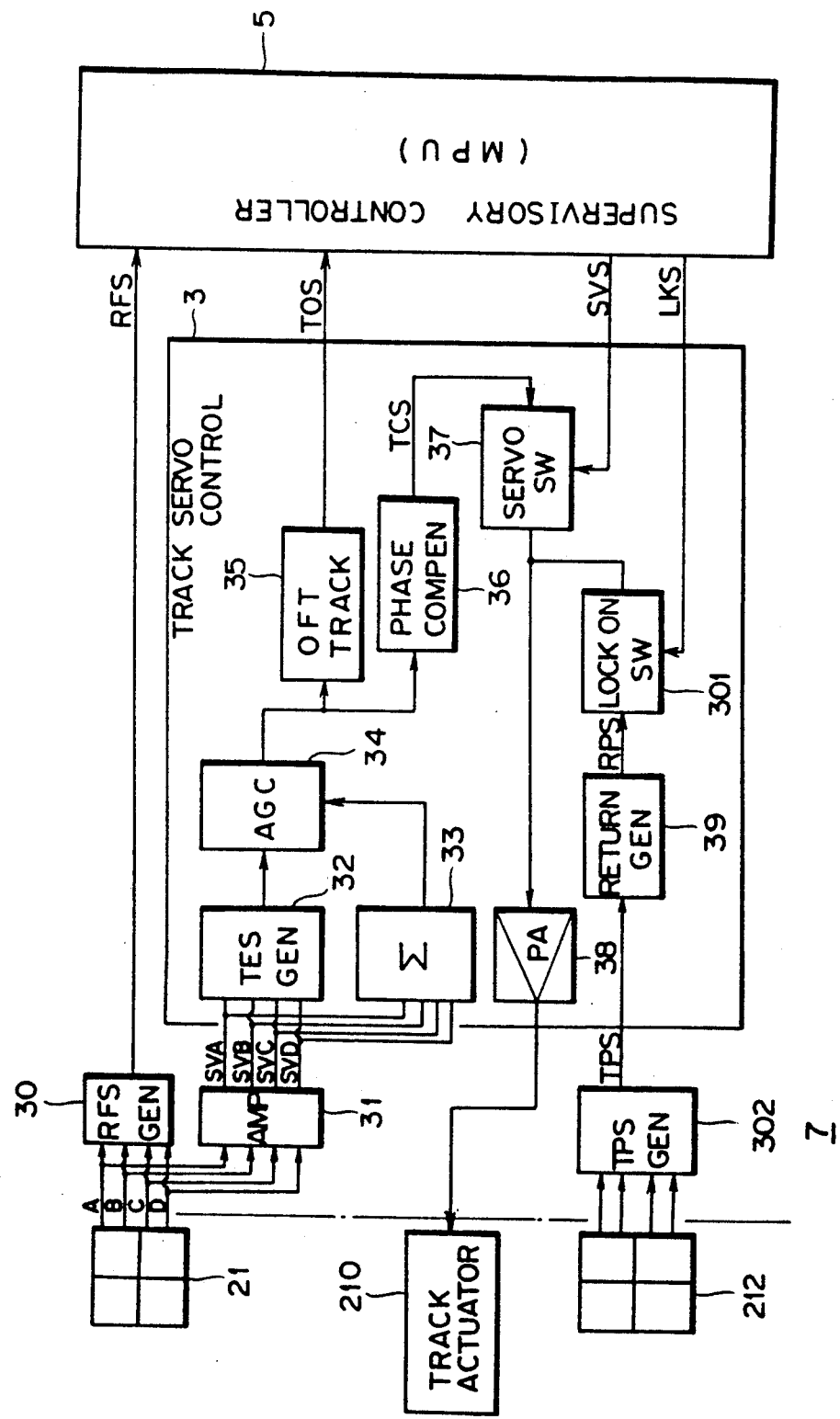
FIG. 6 is a block diagram of a track servo control of an embodiment of the present invention.
Figure 7:
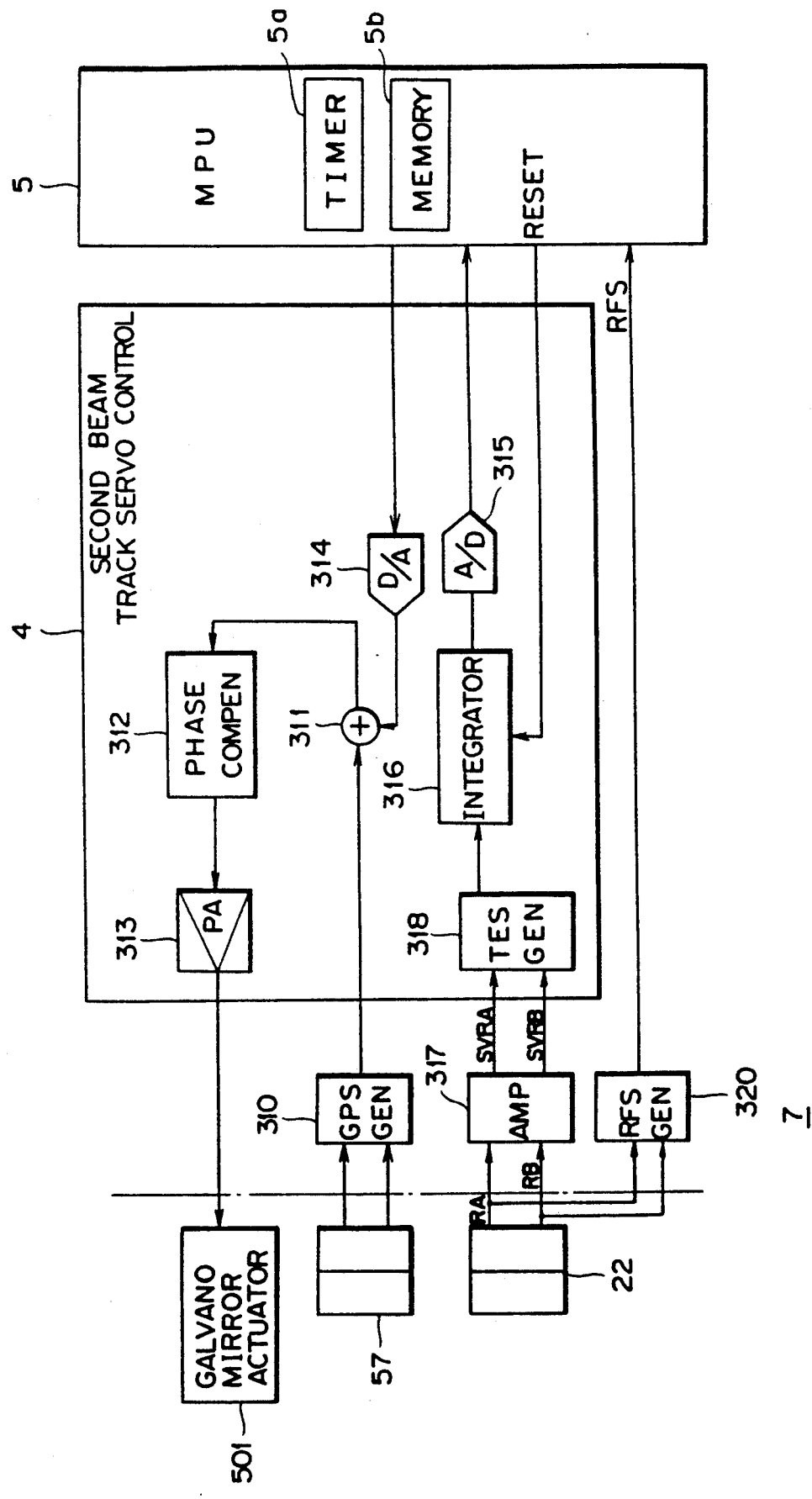
FIG. 7 is a block diagram of a second beam track servo control of an embodiment of the present invention.

The track servo control 3 shown in FIG. 6 and a second beam track servo control 4 shown in FIG. 7 are connected to a supervisory controller 5 constituted from a microprocessor unit (MPU) and controlled thereby. The MPU 5 has a timer 5a and a memory 5b therein.

The track servo control 3 is further connected to an optical head circuit section 7 which includes an RFS generating circuit 30 for producing an RF signal RFS from the four-division photodetector 21 for a write beam, an amplifier 31 for amplifying outputs A to D of the four-division photodetector 21 to develop servo outputs SVA to SVD, and a TPS generating circuit 302 for producing a track position signal TPS from the outputs A to D of the four-division photodetector 212a to 212d of the position sensor. The optical head circuit section 7 further includes, for the second beam track servo control 4, as shown in FIG. 7, a GPS generating circuit 310 for producing a PGS signal from outputs of the two-division photodetector 57 of the galvano mirror position sensor 222, an amplifier 317 for amplifying outputs RA and RB of two-division photodetector 57 for a read signal to develop servo outputs SVRA and SVRB, and an RFS generating circuit 320 for producing an RF signal RFS from the output signals RA and RB of the two-division photodetectors 22.

The RFS generating circuit 30 produces an RF signal RFS from signals from the four-division photodetector 21, and such signal is used to read a track address preformatted on the optical disk. Meanwhile, another RF signal RFS produced from the outputs RA and RB of the two-division photodetectors 22 is used for reading data.

The construction of the track servo control 3 will now be described. The track servo control 3 includes a track error signal generating circuit 32 for producing a track error signal TES from the servo outputs SVA to SVD of the amplifier 31. The track servo control 3 further includes a total signal generating circuit 33 for adding the servo outputs SVA to SVD from the amplifier 31 to produce a total signal DSC which represents a total reflection level. An AGC (automatic gain control) circuit 34 is provided for dividing the track error signal TES by the total signal DSC to execute automatic gain control with a total reflection level employed as a reference value to compensate for variations of a projected beam intensity and a reflection factor. A phase compensating circuit 36 is provided for differentiating the track error signal TES provided with a gain and adding the differentiated value and a proportional component of the track error signal TES to cause the phase of the track error signal TES to advance. An off track detecting circuit 35 is provided for detecting that the track error signal TES assumes a value either higher than a fixed value $V_0$ in the +direction or lower than a fixed value $-V_0$ in the −direction, that is, for detecting an off track condition to deliver an off track signal TOS to the MPU 5.

A servo switch 37 is closed to close a track servo loop in response to a servo-on signal SVS received from the MPU 5 but opens the track servo loop when the servo-on signal SVS is switched off. Meanwhile, a return signal generating circuit 39 for producing, from a signal from the TPS generating circuit 302, a return signal RPS for generating a returning force in the direction across tracks acting to return the object lens actuator body 204 toward the center position. A lock-on switch 301 is closed in response to switching on of a lock-on signal LKS received from the MPU 5 to introduce the return signal RPS to the track servo loop but is opened, when the lock-on signal LKS is switched off, to intercept the introduction of the return signal RPS to the track servo loop. A power amplifier 38 is provided for amplifying an output of the return signal generating circuit 39 to provide a track driving current TDV to the track actuator 210.

The construction of the second beam track servo control 4 shown in FIG. 7 will now be described. The second beam track servo control 4 includes a track error signal generating circuit 318 for producing a track error signal TES from the servo outputs SVRA and SVRB of an amplifier 317. The track error signal TES is integrated by an integrator 316. An analog output of the integrator 316 is converted into a digital signal by an analog to digital converter 315 and transmitted to the MPU5. The integrator 316 is reset in response to a reset signal from the MPU 5. The MPU 5 thus executes a predetermined calculation with a digital input thereto from the analog to digital converter 315 and transmits a result of such calculation to a digital to analog converter 314. The MPU 5 has therein a timer 5a and a memory 5b for storing therein a period of time for which the optical disk 1 makes one complete rotation.

The second beam track servo control 4 further includes a phase compensating circuit 312 for differentiating a GPS outputted from the galvano mirror position signal generating circuit 310 and adding the differentiated value to a proportional component of the GPS to cause the phase of the GPS to advance. A power amplifier 313 is provided for amplifying an output of the phase compensating circuit 312 and providing the amplified signal to the galvano mirror actuator 501 for the galvano mirror 29. An adder 311 is provided for adding a signal from the digital to analog converter 314 to an output GPS of the GPS generating circuit 310.

The operation of the embodiment described above will now be described. A write beam of light of a wavelength of 830 nm emitted from the semiconductor laser 24 is reflected by the optical disk 1 and then received by the four-division photodetector 21. The outputs A to D of the four-division photodetector 21 are amplified by the amplifier 31 to make servo outputs SVA to SVD. The servo outputs SVA to SVD are transmitted to the TES generating circuit 32 at which a track error signal TES is produced from the signals SVA to SVD. The total signal generating circuit 33 adds the servo outputs SVA to SVD to produce a total signal DSC representative of a total reflection level. The AGC circuit 34 divides the track error signal TES by the total signal DSC to execute automatic gain control with the total reflection level employed as a reference value to compensate for variations of an irradiated beam intensity and a reflection factor. The phase compensating circuit 36 differentiates the track error signal TES provided with a gain and adds the differentiated value to a proportional component of the track error signal TES. The servo switch 37 normally assumes an on-state, and an output signal TCS of the phase compensating circuit 36 is amplified by the power amplifier 38 and transmitted to the track actuator 210 by which the actuator body 204 on which the object lens 26 is carried is moved to control the track position of the write beam.

Track servo control which is executed in response to a return signal RPS which is an output of the return signal generating circuit 39 is adopted when the optical head 2 is to be moved to a position near a target track by means of a drive motor not shown. The servo-on signal SVS of the MPU 5 is held in an off-state while the lock-on signal LKS is held in an on-state during movement of the optical head 2. Accordingly, the servo loop is not established in response to the track error signal TES, but the track actuator 210 is controlled to be locked in response to a track position signal TPS produced from the outputs A to D of the four-division photodetectors 212a to 212d. In particular, the track coil 210 is driven by the power amplifier 38 in response to a return signal RPS from the return signal generating circuit 39, and the actuator body 204 is controlled to be returned to and thereafter fixed at the center position.

The reason why the actuator body 204, that is, the object lens 26, is held in a locked condition in this manner is to prevent the actuator body 204 from being moved within the optical head 2 by vibrations during movement of the optical head 2 thereby to prevent possible damages to the optical head. Thus, electric locking is carried out in response to the track position signal TPS.

Further, upon the servo pulling in operation directly after switching on of the servo-on signal SVS after completion of the movement of the optical head 2, while the lock-on signal LKS is held in an on-state, track follow-up is controlled in accordance with the track error signal TES while providing a returning force toward the center position of FIG. 4B with the lock-on signal LKS. Consequently, pulling in to a track of the optical disk 1 which is in an eccentric condition is carried out at a position at which the amount of movement in a radial direction (in a direction transverse to the tracks) is minimum, and stabilized starting of pulling in can be realized.

After completion of the servo pulling in operation, the lock-on signal LKS is switched off while the servo-on signal SVS is held in an on-state, thereby cancelling the control responsive to the return signal RPS. Meanwhile, when off track of a write beam is detected by the off track detecting circuit 35, a track off signal TOS is transmitted to the MPU 5. In response to the track off signal TOS, the MPU 5 switches the servo switch 37 off and switches the lock-on switch 310 on to execute control for causing the write beam to approach the target track.

While the track control for a write beam is described above, the operation of the track servo control 3 and the MPU 5 is similar to operation of those of a conventional apparatus and does not make essential part of the present invention. The track positions of a write beam and a read beam are moved simultaneously in accordance with such track servo control as described above.

In the following, track control of a read beam which is a characteristic of the present invention will be described with reference to FIG. 7.

A value GPS=A−B is obtained by the GPS generating circuit 310 from the outputs A and B of the two-division photodetectors 57a and 57b of the galvano mirror position sensor 222. The phase compensating circuit 312 differentiates the value GPS and adds the differentiated value to a proportional component of the signal GPS to cause the phase of the signal GPS to advance. An output of the phase compensating circuit 312 is amplified by the power amplifier 313 and transmitted to the galvano mirror actuator 501. The servo loop which is constituted from the two-division photodetector 57 of the galvano mirror position sensor 222, GPS generating circuit 310, phase compensating circuit 312, power amplifier 313 and galvano mirror actuator 501 electrically locks the galvano mirror 29 to maintain the position of the galvano mirror 29.

Meanwhile, outputs of the two-division photodetector 22, which receives a reflected signal of a read beam, are amplified by the amplifier 317 to make servo outputs SVRA and SVRB, from which a track error signal TES is produced by the TES generating circuit 318. The track error signal TES is integrated by the integrator 316. This integration is executed to enlarge an error to detect a fine displacement of tracks.

Figure 8:
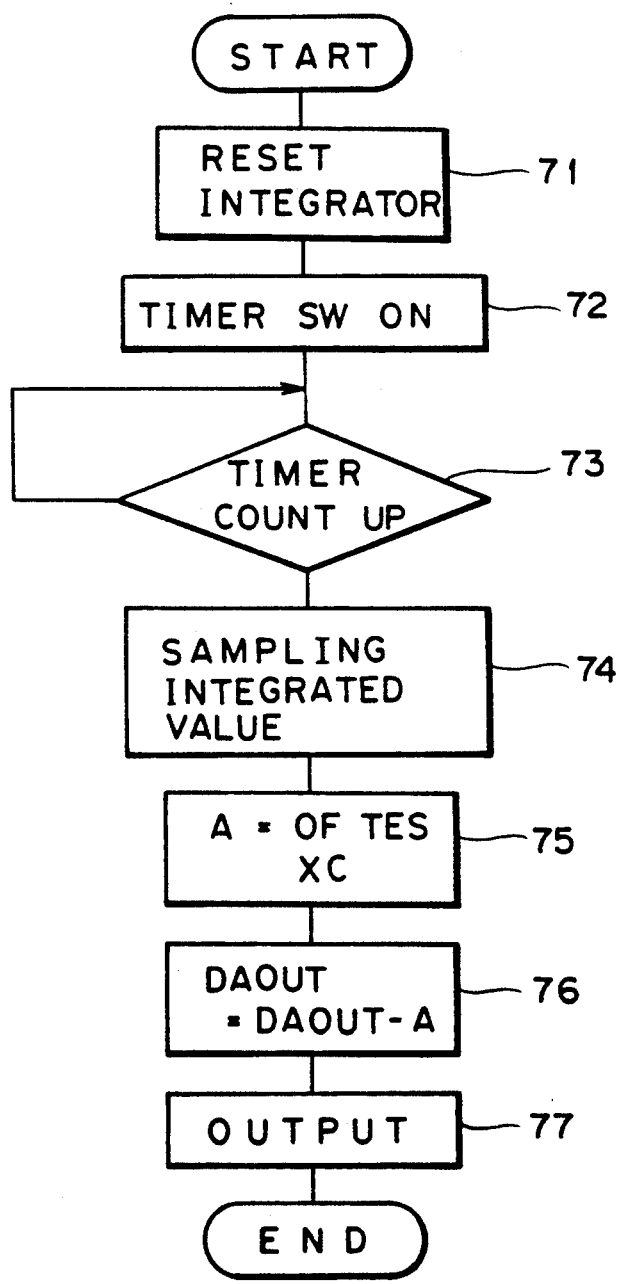
FIG. 8 is a flow chart illustrating operation of the second beam track servo control shown in FIG. 7.
Figure 9:
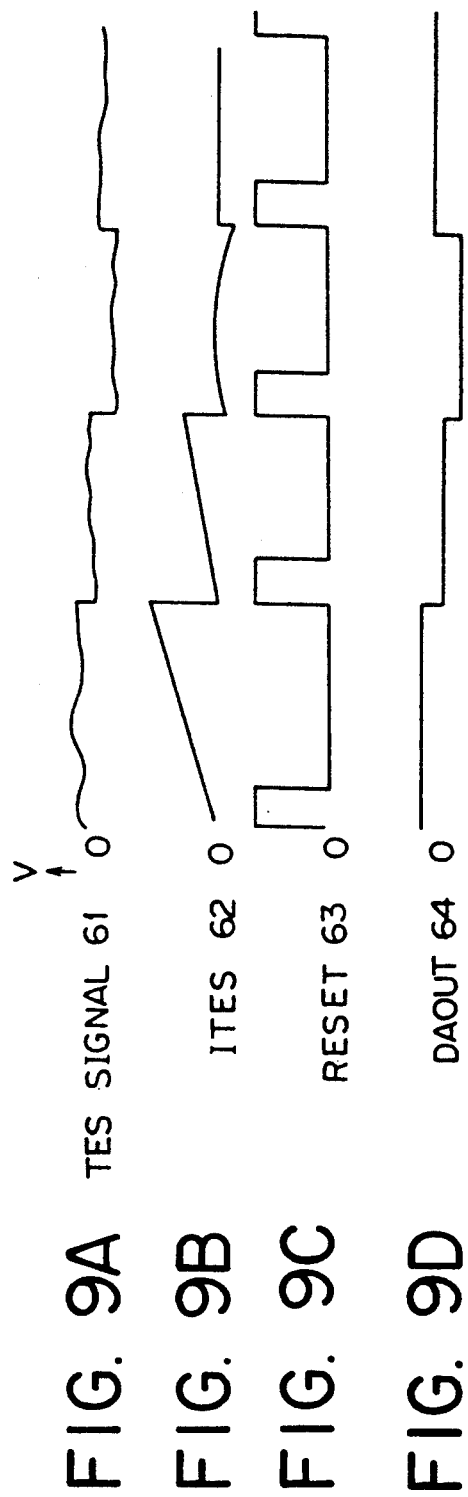
FIGS. 9A, 9B, 9C and 9D are wave form diagrams of various signals when the second beam track servo control shown in FIG. 7 operates.

In the following, an offset correction flow of a read beam will be described with reference to the flow chart of FIG. 8.

At first, the MPU 5 resets the integrator 316 with a reset signal (step 71). Then, the timer 5a of the MPU 5 is started (step 72). At step 73, the timer 5a is repetitively incremented by one until a precedently stored period of time elapses that is necessary for the optical disk 1 to make one complete rotation. Then the process advances to step 74. At step 74, a result OFTES of the integration is sampled. The integration result OFTES is obtained by converting a value of the TES signal integrated by the integrator 316 into a digital signal by means of the analog to digital converter 315. Subsequently, the integration result OFTES is multiplied by a predetermined constant to obtain a result A (at step 75). At step 76, a value DAOUT which is a preceding output to the digital to analog converter 314 is subtracted by the value A to update the value DAOUT, and then at step 77, the value DAOUT is outputted to the digital to analog converter 314.

The value DAOUT outputted from the MPU 5 to the digital to analog converter 314 is converted into an analog signal by the digital to analog converter 314, and then it is added to an output of the GPS generating circuit 310 by the adder 311.

Referring to FIGS. 9A-9D, there are shown wave forms of such various output signals as described above. A TES signal produced from the outputs of the two-division photodetector 22 by which reflected light of a read beam is received has such a wave form as shown by a curve 61 in FIG. 9A. The TES signal 61 is integrated by the integrator 316 to make an ITES signal 62. The ITES signal 62 is cleared to zero each time the integrator 316 is reset by the MPU 5. A signal DAOUT 64 is outputted from the MPU 5 and represents a value of the preceding value DAOUT from which the integrated value is subtracted.

The signal DAOUT is converted into an analog signal by the digital to analog converter 314 and added to the signal GPS by the adder 311. Consequently, a signal to be output to the phase compensating circuit 312 is varied in response to a displacement of the read beam across tracks or in the direction transverse to the tracks. The phase compensating circuit 312 differentiates an output of the adder 311, and the differentiated value is added to a proportional component of the output of the adder 311 to cause the phase of the signal GPS to advance. Such addition by the adder 311 of the signal DAOUT produced in response to the TES signal by the MPU 5 is executed each time the optical disk makes one complete rotation.

In the embodiment of the present invention described above, control of the track position of a write beam is executed by the track servo control 3 in a similar manner as in a conventional apparatus while at the same time correction of the track position of a read beam is executed in response to a position signal of the galvano mirror and a track error signal TES of the read beam which is produced each time the optical disk makes one complete rotation. Consequently, both the write beam and the read beam can always be positioned accurately on the same track without causing displacement of the track position of the read beam which may otherwise be caused by a temperature variation, time aging or the like.

Figure 10:
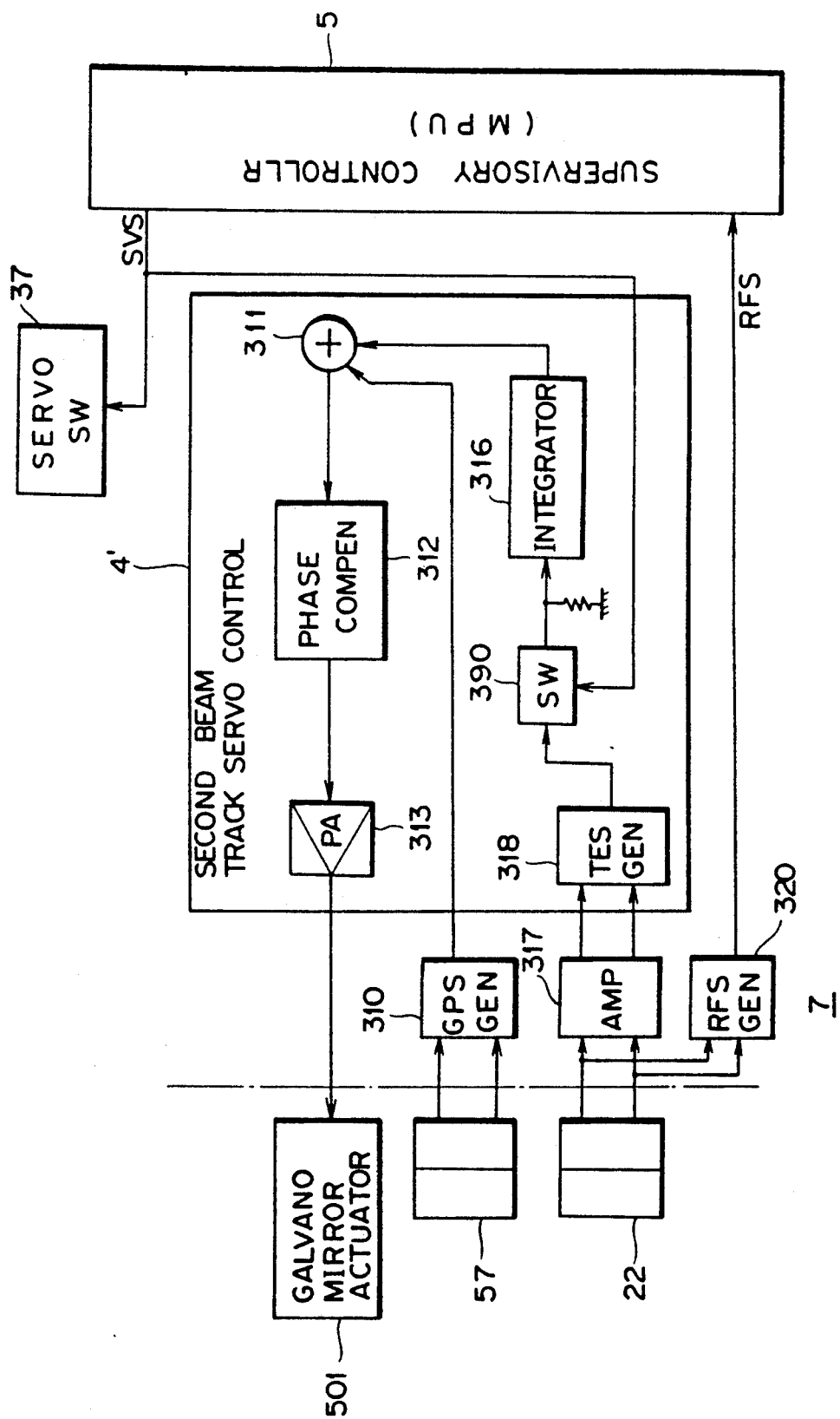
FIG. 10 is a block diagram of a second embodiment of a second beam track servo control.

Subsequently, referring to FIG. 10, a second beam track servo control 4' of a second embodiment of the present invention will be described. Similarly to the first embodiment shown in FIG. 7, a track error signal TES is integrated by an integrator 316, and a result of such integration is added to a GPS signal by an adder 311. A signal for causing the phase of a signal to advance for a galvano mirror actuator 501 is produced in accordance with an output of the adder 311 by a phase compensating circuit 312. In the present embodiment, when a track servo signal SVS is switched off, the input to the integrator 316 is reduced to zero thereby to hold the output of the integrator 316. In other words, in the present embodiment, compensation of the track position of a read beam is executed normally when the track servo signal SVS is in an on-state.

While the present invention has been described so far in connection with the embodiments shown in the drawings, the present invention is not limited to the particulars. For example, a write beam may be controlled relative to a read beam while using the read beam for the track control of an optical head. Further, while two beams of light are projected from the single object lens, otherwise three or more beams of light may be projected through a single object lens while using one of the beams for the erasing of data.

What is claimed is:

1. A beam track position control apparatus for an optical disk apparatus including a rotatable optical disk on which a plurality of guide grooves for guiding a beam spot projected thereon are spirally formed along a direction of rotation of the rotatable optical disk, an optical head including a first light source for emitting a first beam of light, a second light source for emitting a second beam of light and an object lens for focusing the first and the second beams onto the optical disk, and track actuator means for moving the object lens in the radial direction, said beam track position control apparatus comprising:

first photodetector means for detecting light of the first beam reflected from said optical disk and producing a first output signal;

second photodetector means for detecting light of the second beam reflected from said optical disk and producing a second output signal;

means for inclining the optical axis of the second beam passing through said object lens and changing the position of the second beam incident on said optical disk;

actuator means for driving said optical axis inclining means;

third photodetector means for detecting a current position of said optical axis inclining means and producing a third output signal;

first control means for controlling said track actuator means based on a track error signal obtained from the first output signal from said first photodetector means; and second control means for controlling said actuator means based on another track error signal obtained from the second output signal from said second photodetector means and a current position signal obtained from the third output signal from said third photodetector means to thereby change the position of the second beam incident on said optical disk.

2. A beam track position control apparatus according to claim 1, wherein said optical axis inclining means is a mirror pivotally mounted about a pivot axis.

3. A beam track position control apparatus according to claim 1, wherein said first beam is a write beam and said second beam is a read beam.

4. A beam track position control apparatus according to claim 1, wherein said first photodetector means comprises a four-division photodetector and said second and third photodetectors each comprises a two-division photodetector.

5. A beam track position control apparatus for an optical disk apparatus including a rotatable optical disk on which a plurality of guide grooves for guiding a beam spot projected thereon are concentrically formed, an optical head including a first light source for emitting a first beam of light, a second light source for emitting a second beam of light and an object lens for focusing the first and the second beams onto the optical disk, and track actuator means for moving the object leans in the radial direction, said beam track position control apparatus comprising:

first photodetector means for detecting light of the first beam reflected from said optical disk and producing a first output signal;

second photodetector means for detecting light of the second beam reflected from said optical disk and producing a second output signal;

means for inclining the optical axis of the second beam passing through said object lens and changing the position of the second beam incident on said optical disk;

actuator means for driving said optical axis inclining means;

third photodetector means for detecting a current position of said optical axis inclining means and producing a third output signal;

first control means for controlling said track actuator means based on a track error signal obtained from the first output signal from said first photodetector means; and second control means for controlling said actuator means based on another track error signal obtained from the second output signal from said second photodetector means and a current position signal obtained from the third output signal from said third photodetector means to thereby change the position of the second beam incident on said optical disk.

6. A beam track position control apparatus according to claim 5, wherein said optical axis inclining means is a mirror pivotally mounted about a pivot axis.

7. A beam track position control apparatus according to claim 5, wherein said first beam is a write beam and said second beam is a read beam.

8. A beam track position control apparatus according to claim 5, wherein said first photodetector means comprises a four-division photodetector and said second and third photodetectors each comprises a two-division photodetector.

* * * * *

UNITED STATES PATENT AND TRADEMARK OFFICE
CERTIFICATE OF CORRECTION

PATENT NO. : 5,150,347

DATED : SEPTEMBER 22, 1992

INVENTOR(S) : SHIGENORI YANAGI ET AL.

It is certified that error appears in the above-identified patent and that said Letters Patent is hereby corrected as shown below:

Col. 13, line 37, "leans" should be --lens--.

Signed and Sealed this

Twenty-eighth Day of September, 1993

Attest:

BRUCE LEHMAN

Attesting Officer

Commissioner of Patents and Trademarks